(12) United States Patent
Ono

(10) Patent No.: US 8,023,064 B2
(45) Date of Patent: Sep. 20, 2011

(54) LIQUID CRYSTAL DISPLAY DEVICE HAVING A FLEXIBLE SEAL MEMBER PRESSED IN A VERTICAL DIRECTION TO EXPAND IN AN IN-PLANE DIRECTION

(75) Inventor: Shin-ichirou Ono, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 474 days.

(21) Appl. No.: 11/686,879

(22) Filed: Mar. 15, 2007

(65) Prior Publication Data

US 2007/0222917 A1    Sep. 27, 2007

(30) Foreign Application Priority Data

Mar. 22, 2006   (JP) ................................. 2006-079508

(51) Int. Cl.
*G02F 1/1333* (2006.01)
*G02F 1/1335* (2006.01)
(52) U.S. Cl. .......................................... 349/60; 349/65
(58) Field of Classification Search .................... 349/60, 349/65, 58
See application file for complete search history.

(56) References Cited

U.S. PATENT DOCUMENTS

| 4,155,559 | A | * | 5/1979 | Sieghartner | 277/396 |
| 6,295,105 | B1 | * | 9/2001 | Lee et al. | 349/65 |
| 6,507,377 | B1 | * | 1/2003 | Jung | 349/60 |
| 2005/0062899 | A1 | * | 3/2005 | Fukayama et al. | 349/58 |
| 2005/0062901 | A1 | * | 3/2005 | Inoue | 349/58 |
| 2006/0066769 | A1 | * | 3/2006 | Minaguchi et al. | 349/58 |
| 2006/0181843 | A1 | * | 8/2006 | Takahashi | 361/681 |

FOREIGN PATENT DOCUMENTS

| CN | 1076800 | | 9/1993 |
| GB | 2 264 583 | | 1/1993 |
| GB | 2264583 | A * | 9/1993 |
| JP | 2005-91971 | | 4/2005 |

* cited by examiner

*Primary Examiner* — Mark A Robinson
*Assistant Examiner* — Paul C Lee
(74) *Attorney, Agent, or Firm* — Hayes Soloway P.C.

(57) ABSTRACT

A LCD device includes a backlight unit, a shield front, and a display panel disposed between the backlight unit and the display panel. A flexible seal member is provided on the mounting surface of the backlight unit. After attachment of the shield front onto the mounting surface, the flexible seal member is deformed to press the edge surface of the display panel in the in-plane direction of the display panel.

10 Claims, 10 Drawing Sheets

LIQUID CRYSTAL DISPLAY DEVICE HAVING A FLEXIBLE SEAL MEMBER PRESSED IN A VERTICAL DIRECTION TO EXPAND IN AN IN-PLANE DIRECTION

BACKGROUND OF THE INVENTION

1. Field of the Invention

The present invention relates to a liquid crystal display (LCD) device having a flexible seal member and, more particularly, to a LCD device including: a light source unit having a light-emitting surface; a LCD panel mounted on the light-emitting surface and configured to have a light switching function; and a frame-shaped shield front which defines the front screen of the LCD panel.

2. Description of the Related Art

A LCD device typically has a structure in which a panel assembly (LCD panel assembly) is held and fixed between a light source unit (backlight unit) and a shield front. FIG. 13 is a perspective view showing the configuration of a conventional LCD device as viewed from the front screen side. FIG. 14 is an exploded perspective view showing the LCD device of FIG. 13.

A LCD device 100 is provided with a light source unit 11 having a rectangular light-emitting surface 11a on the front side thereof, a panel assembly 12 mounted on the light-emitting surface 11a and configured to have a light switching function, and a frame-shaped shield front 13 which defines the front screen 13a for the panel assembly 12.

The panel assembly 12 is provided with a display panel 21 in which a TFT substrate 25 and a counter substrate 26 overlap with each other, a plurality of TCPs (Tape Carrier Packages) 22 coupled to the display panel 21, and a circuit board 23 mechanically and electrically coupled to the display panel 21 via the TCP 22. The TCPs 22 each mount thereon an IC chip for driving the display panel 21, and the circuit board 23 outputs a control signal for controlling the drive of the display panel 21 by the TCP 22. The TCP 22 and circuit board 23 are arranged along, e.g., two adjacent edges of the display panel 21.

The display panel 21 is provided with a liquid crystal (LC) layer (not shown) sandwiched between the TFT substrate 25 and the counter substrate 26, and polarization films (not shown) disposed on the rear surface of the TFT substrate 25 and the front surface of the counter substrate 26. The display panel 21 has pixels arranged in a two-dimensional matrix. On the TFT substrate 25, switching devices such as TFTs (Thin Film Transistors) are arranged in a matrix for controlling the switching of respective pixels to configure an active matrix substrate. On the counter substrate 26, color filters (CF) of different colors corresponding to the respective pixels are formed to configure a color-filter substrate (CF substrate) 26. Driving of the TFT devices via the circuit board 23 and TCP 22 achieves control of the panel assembly in a pixel-by-pixel basis.

The light source unit 11, which is, e.g., an edge-light-type backlight unit, has a frame-shaped chassis 31 for defining the light-emitting surface 11a on the front side thereof. On the chassis 31, ribs 32 are arranged for defining the position of the display panel relative to the light-emitting surface 11a and formed integrally with the chassis 31. The ribs 32 are arranged near the four corners of the light-emitting surface 11a. Each of the ribs 32 has an elongate rectangular solid shape which is bent at right angles along the corner of the display panel.

FIG. 15 is a sectional view taken along XV-XV line shown in FIG. 13. The light source unit 11, or the edge-light backlight unit, has an optical sheet 33, an optical guide plate 34 and a reflection sheet 35, which are sequentially stacked on the light-emitting surface 11a of the light source unit, as viewed from the front side. Further, an elongate lamp (not shown) is provided on the side edge of the optical guide plate 34. The optical guide plate 34 diffuses the light entering the optical guide plate 34 from the elongate light source in the in-plane direction thereof, to thereby convert the elongate light into a planar light. The reflection sheet 35 reflects the light emitted from the rear surface of the optical guide plate 34 toward the front surface of the light source unit 11. The optical sheet 33 has a function of enhancing brightness or luminance of the light-emitting surface 11a and uniformity of the luminance.

The chassis 31 has, around the light-emitting surface 11a, a flat mounting surface 36 on which the TFT substrate 25 is mounted and a concaved portion 37 which is formed nearer to the light-emitting surface 11a than the mounting surface 36 and receives therein the polarization film 27. The ribs 32 each have a position-restricting wall 32a which is located opposite to the side edge of the display panel so as to restrict the position of the display panel and an inclined surface 32b which extends from the edge of the position-restricting wall 32a in order for the display panel to be easily mounted on the light source unit 11. The chassis 31 is accommodated in a shield rear 38 of which top surface is open; and the optical sheet 33, optical guide plate 34, and reflection sheet 35 are disposed between the chassis 31 and the shield rear 38. Reference numerals 29 and 30 denote a seal member for sealing the LC layer 24 and the boundary of the display area, respectively.

During assembly of the LCD device 100, the position of the panel assembly 12 is first adjusted in the in-plane direction thereof with respect to the light source unit 11 such that the four corners of the display panel of the panel assembly are located within the area defined by the ribs 32 and, then, the panel assembly 12 is mounted on the light source unit 11. More specifically, the TFT substrate 25 of the panel assembly 12 is mounted on the mounting surface 36 of the chassis 31 with the polarization film 27 received in the concaved portion 37 of the chassis 31. Thereafter, the shield front 13 is placed to cover the light source unit 11 and panel assembly 12 to press the panel assembly 12 down to a predetermined position to thereby complete the assembly. Fixation between the light source unit 11 and the shield front 13 is achieved by screwing, caulking, or pawl engagement.

The conventional LCD device 100 has a disadvantage in that adhesion of dust onto the light-emitting surface 11a of the light source unit causes a defective image on the screen. That is, the shadow of the dust is projected on the screen 13a. This defective image is caused by the following factors. In the LCD device 100, a gap of 0.2 to 0.3 mm is intentionally provided between the side edge of the display panel 21 and the ribs 32, in consideration of the range of variation in the outside dimension of the display panel 21 and the range of variation in the distance between the ribs 32. Further, in consideration of the range of variation in the thickness dimension or distortion of the light source unit 11 or shield front 13, a gap of 0.1 to 0.3 mm is provided between the display panel 21 and the shield front 13 so as to prevent the inner surface of the shield front 13 from being brought into contact with the display panel 21. Thus, the display panel 21 or panel assembly 12 is movable within these gaps in the thickness direction and in-plane directions, as denoted by arrows of reference numeral 101.

As described above, in the conventional LCD device 100, the display panel 21 is provided in the movable state between the light source unit 11 and the shield front 13. Therefore, as shown by a reference numeral 102, dust enters the rear side of the display panel 21 through the gap between the display panel 21 and the shield front 13 and the gap between the display panel 21 and the chassis 31 of the light source unit 11. The dust that has entered the rear side of the display panel 21 is then adhered onto the light-emitting surface 11a of the light source unit 11.

As a countermeasure against the above disadvantage, there is known a method that provides a sealing member 103 in the gap between the display panel 21 and the shield front 13, as shown in FIG. 16. A LCD device in which the sealing member 103 is provided in the gap between the display panel and the shield front is described in, for example, Patent Publication JP-2005-91971A (FIG. 1).

In the LCD device 110 shown in FIG. 16, the gap between the display panel 21 and the shield front 13 is sealed by the sealing member 103. The sealing member 103 cuts off the entry route of the dust, thereby blocking the entrance of the dust.

However, in the LCD device 110 of FIG. 16, a significant range of variation occurs in the gap distance between the display panel 21 and the shield front 13 due to the variation in the outside dimension or distortion of the light source unit 11 or shield front 13. Accordingly, in order to surely block the entry route of the dust, it is necessary to form the sealing member 103 using a flexible material and makes the thickness thereof sufficiently large in consideration of the range of variation in the gap distance. However, examinations conducted by the present inventor revealed that a larger thickness of the sealing member 103 changes the gap distance of the LC layer 24 because the sealing member 103 presses the display panel 21 in the thickness direction thereof, thereby causing an uneven image on the screen. In order to achieve a LCD device having an excellent image quality, it is essential to prevent entrance of the dust into the rear side of the display panel while suppressing occurrence of the uneven image.

SUMMARY OF THE INVENTION

In view of the above, it is an object of the present invention to provide a LCD device capable of preventing entrance of the dust into the rear side of the display panel while suppressing occurrence of the uneven image.

The present invention provides a liquid crystal display (LCD) device including: a display panel including a liquid crystal (LC) layer sandwiched between a pair of substrates; a backlight unit for supplying backlight to the LC layer; and a shield front for sandwiching the display panel between the shield front and the backlight unit; and a flexible shield member fixed onto one of the backlight unit and the shield front for pressing an edge surface of the display panel in an in-plane direction of the display panel.

In accordance with the LCD device of the present invention, the flexible seal member pressing the display panel in the in-plane direction thereof prevents dust from entering the internal of the LCD device, thereby preventing the shadow of dust from degrading the image quality of the LCD device.

The above and other objects, features and advantages of the present invention will be more apparent from the following description, referring to the accompanying drawings.

DETAILED DESCRIPTION OF THE PREFERRED EMBODIMENTS

Figure 1:
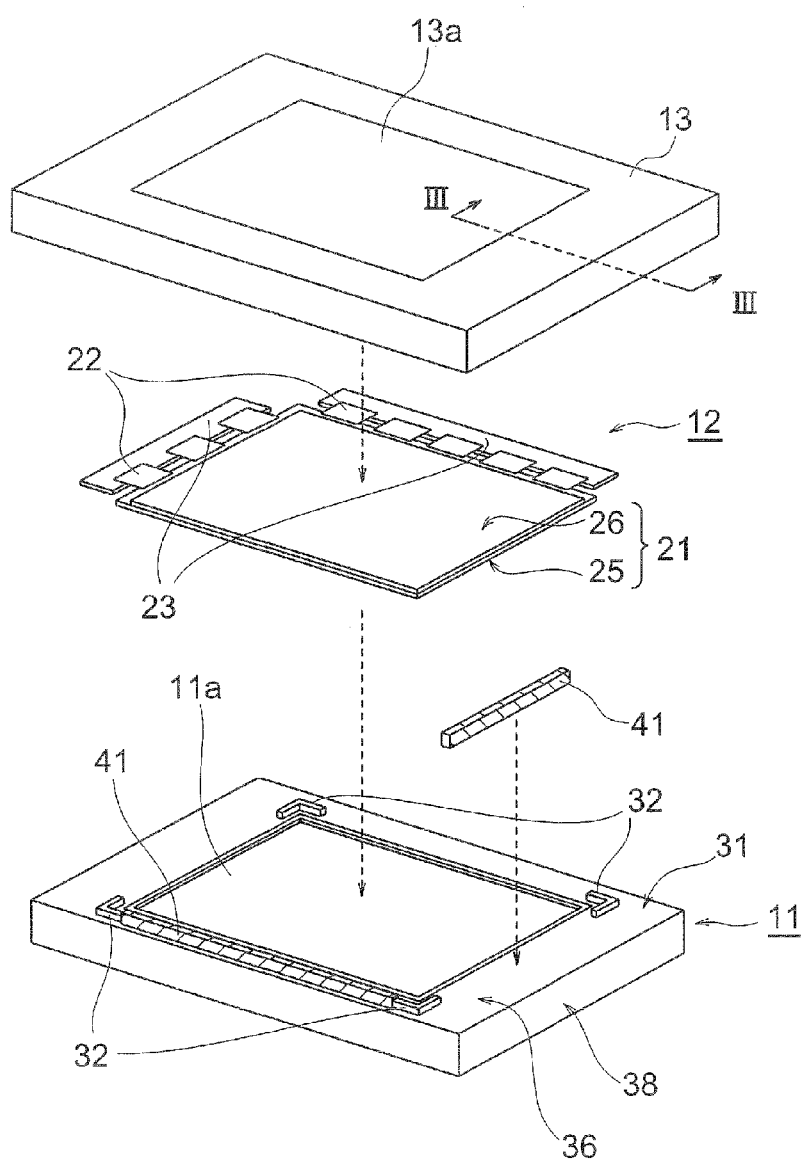
FIG. 1 is an exploded perspective view showing a LCD device according to a first embodiment of the present invention.
Figure 13:
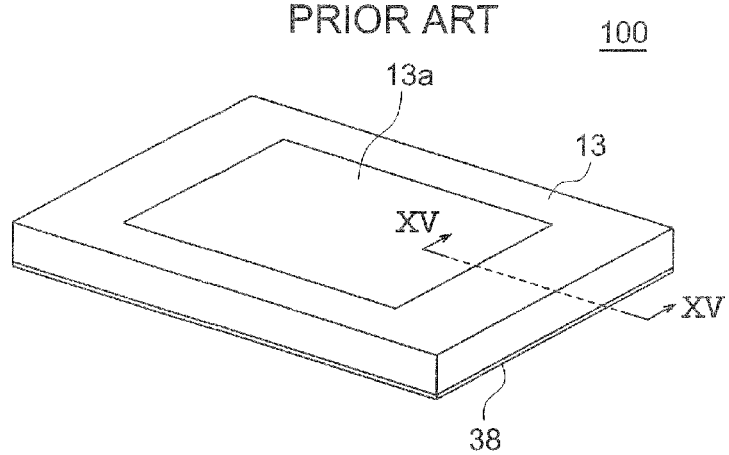
FIG. 13 is a perspective view showing the configuration of a conventional LCD device.
Figure 14:
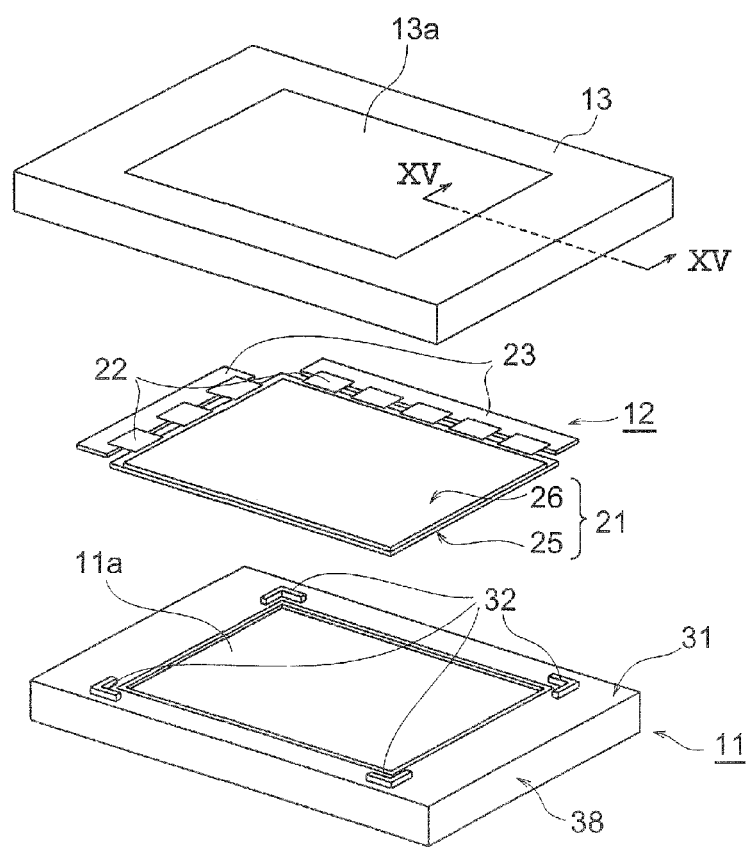
FIG. 14 is an exploded perspective view showing the LCD device of FIG. 13.
Figure 15:
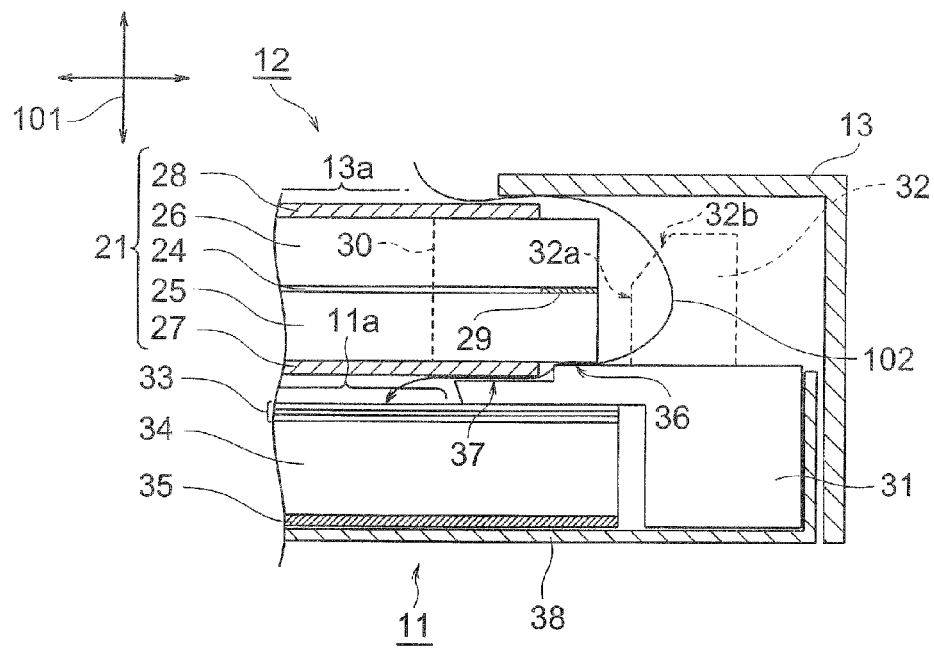
FIG. 15 is a sectional view showing the disadvantage of a conventional LCD device.
Figure 16:
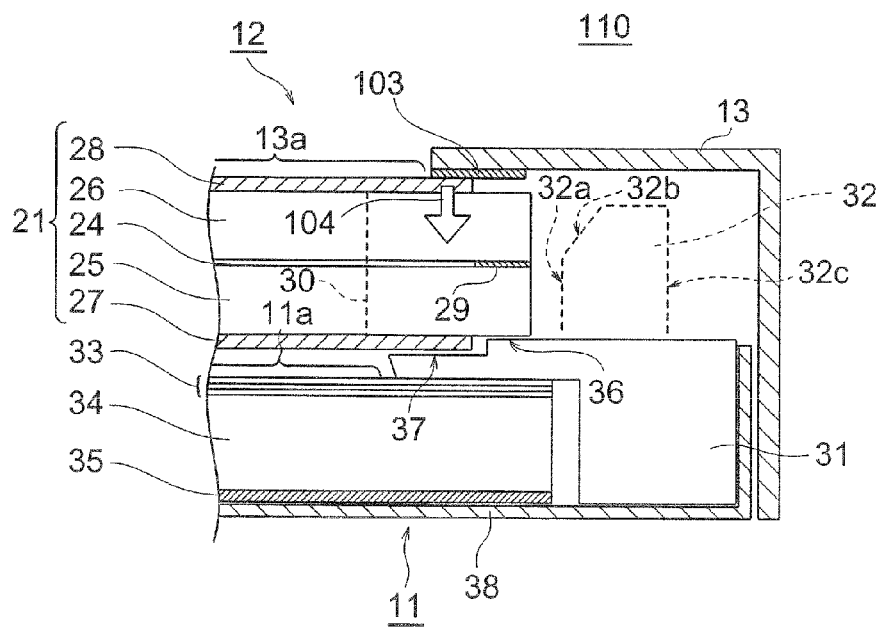
FIG. 16 is a sectional view showing the configuration of a conventional LCD device which has a countermeasure against the disadvantage of the LCD device shown in FIG. 15.

Now, preferred embodiments of the present invention will be described with reference to the accompanying drawings, wherein similar constituent elements are designated by similar reference numerals. FIG. 1 is an exploded perspective view showing a LCD device according to a first embodiment of the present invention. A LCD device 10 has a configuration similar to that of the conventional LCD device 100 shown in FIGS. 13 to 15 except that a flexible seal member 41 is provided on the mounting surface 36 of the chassis 31. The flexible seal member 41, which is of an elongate shape and has a rectangular cross-section, is disposed on the line extending from the linear piece of the ribs 32 so as to fill the gap between adjacent ribs 32. The flexible seal member 41 is provided near the edges of the display panel 21 on which the TCP 22 and circuit board 23 are not provided.

Figure 2:
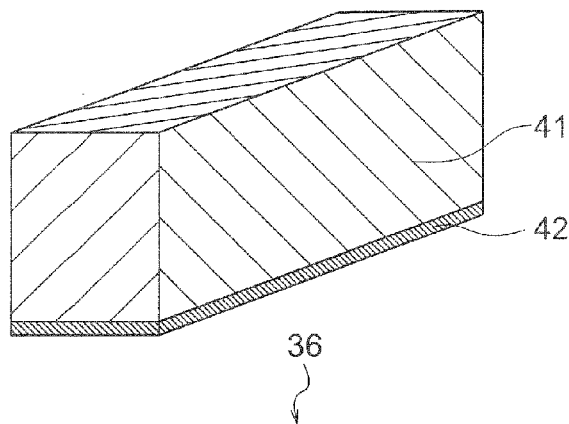
FIG. 2 is a perspective view showing the detail of the flexible seal member shown in FIG. 1.

FIG. 2 is a perspective view showing the configuration of the flexible seal member 41. Although the flexible seal member 41 is made of foamed urethane having flexibility in the present embodiment, other various flexible materials may be used to configure the flexible seal member 41. The flexible seal member 41 is fixed onto the mounting surface 36 of the chassis 31 by adhesion using a two-sided adhesive tape 42. The flexible seal member 41 is deformed without loosing the comparatively soft property thereof when a pressure is applied, and is restored to have the original shape before deformation after the pressure is removed.

Figure 3:
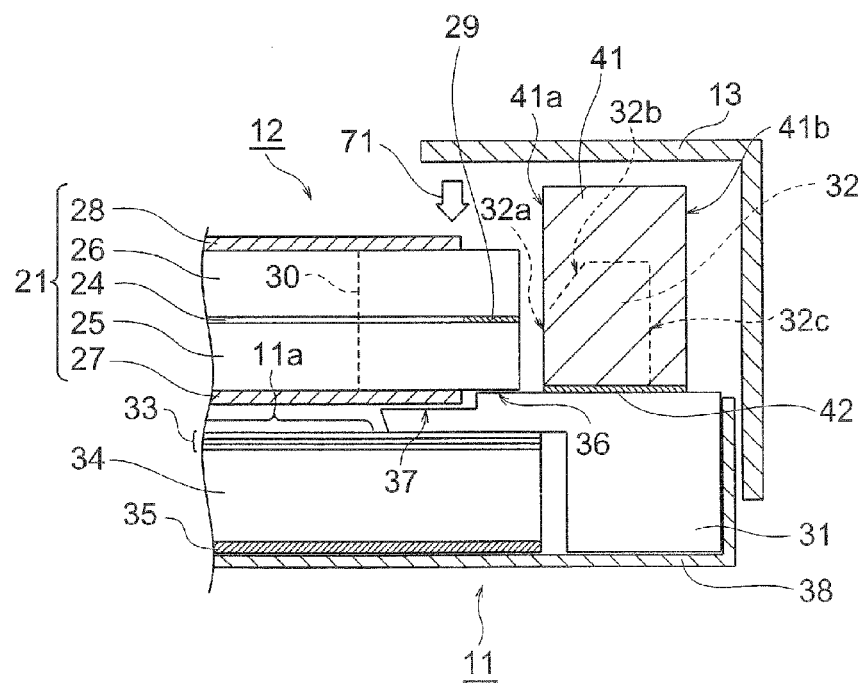
FIG. 3 is a sectional view taken along line III-III shown in FIG. 1, in the state where the shield front is to be attached onto the light source unit.

FIG. 3 is a sectional view taken along line III-III shown in FIG. 1 in the state where the shield front 13 is to be attached onto the light source unit 11. The vertical dimension of the flexible seal member 41 is set such that it sufficiently exceeds the height of the inner surface of the shield front 13 that is opposite to the mounting surface 36 before the shield front 13 is attached onto the light source unit 11. As viewed in the in-plane direction of the display panel 21, the inner side surface 41a of the flexible seal member 41 that is opposite to the side edge of the display panel 21 is aligned with the position-restricting wall 32a of the rib 32; whereas the outer side surface 41b of the flexible seal member 41 that is opposite to the side wall of the shield front 13 is located at the position further than the position of the outer surface 32c of the rib 32 with respect to the display panel 21. After the shield front 13 is attached onto the light source unit 11, the shield front 13 is moved in the direction of an arrow 71 and is pressed down to a predetermined position.

Figure 4:
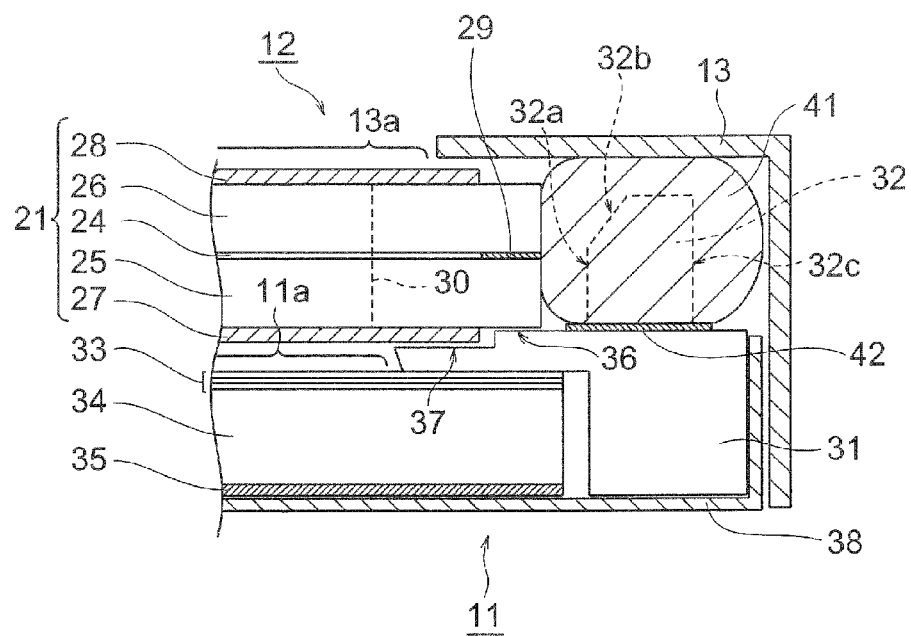
FIG. 4 is a sectional view taken along line III-III shown in FIG. 1 in the state where the shield front is attached onto the light source unit.

FIG. 4 is a sectional view taken along line III-III shown in FIG. 1 in the state where the shield front 13 has been attached onto the light source unit 11 after the state shown in FIG. 3. After the shield front 13 is attached, the inner rear surface of the shield front 13 that is opposite to the mounting surface 36 is brought into contact with the top surface of the flexible seal member 41 to press down the flexible seal member 41 in the thickness direction. As a result, the flexible seal member 41 expands in the in-plane direction of the display panel 21 to be deformed in a flattened shape. The side portion of the flattened flexible seal member 41 is brought into contact with the side edge surface of the display panel 21 to press the same with an appropriate force. In this state, the flexible seal member 41 does not press the display panel 21 in the thickness direction.

According to the LCD device 10 of the present embodiment, when the shield front 13 is attached onto the mounting surface 36 of the chassis 31, the flattened flexible seal member 41 presses the side edge of the display panel 21 with the appropriate force, thereby blocking off the entry route of the dust and thus preventing the entrance of the dust into the rear side of the display panel 21. Therefore, the defective display that the shadow of the dust is projected on the screen 13a can be prevented in the present embodiment. Further, in this state, the flexible seal member 41 does not press the display panel 21 in the thickness direction thereof, whereby occurrence of a change in the thickness of the LC layer 24 can be avoided to prevent the uneven image.

When the panel assembly 12 is mounted on the light source unit 11, or when the shield front 13 is attached onto the light source unit 11, the flexible seal member 41 is not brought into contact with the side edge of the display panel 21 or side portion of the shield front 13. Therefore, the LCD device 10 can be assembled with ease. When the LCD device 10 is disassembled for repairs or the like, the pressure applied by the shield front 13 is removed to restore the flexible seal member 41 to have the original shape thereof shown in FIG. 3. Therefore, even after the disassembling, the LCD device 10 can be again assembled with ease.

It is preferable to use, as a material for the flexible seal member 41, one that is deformed without loosing the comparatively soft property thereof when a pressure is applied and, further, one that is restored to have the original shape before the deformation after the pressure is removed. Examples of such a material include foamed urethane, low-repulsion urethane, foamed silicone, foamed rubber, and gel. This is because easy deformation of the flexible seal member 41 to have a flattened shape enhances the adhesiveness between the flexible seal member 41 and the side edge of the display panel 21, thereby effectively enhancing the dust-proof property.

If the flexible seal member 41 is made of an excessively hard material, the shield front 13 may be pressed up by the repulsion force of the flexible seal member 41, which may increase the thickness of the LCD device 10. Further, if vibration or impact is applied from the outside, the shield front 13 may be disengaged from the light source unit 11 to damage the display panel 21. In the present embodiment, by using a material that is restored to have the original shape before the deformation after the pressure is removed, the flexible seal member 41 is restored to have the original shape thereof after the shield front 13 is removed. This allows the LCD device 10 to be assembled with ease us even after the disassembling.

Although the edge-light backlight unit is used as the light source unit 11 in the above embodiment, a direct-emission type backlight unit may be used instead. Further, although the flexible seal member 41 is provided on the mounting surface 36 of the chassis 31 in the above embodiment, it may be provided on the inner surface of the shield front 13 that is opposite to the mounting surface 36. Further, after the shield front 13 is attached, another member other than the shield front 13 may press down the flexible seal member 41. Further, a pressing member may be used to press down the flexible seal member 41 before the final attachment of the shield front 13. The flexible seal member 41 may be fixed by adhesive, screw, engaging means, or held in a groove or between ribs.

In the above embodiment, although the flexible seal member 41 is provided along the two sides of the display panel 21 on which the TCP 22 and circuit board 23 are not provided, it may arbitrarily be provided in correspondence with various arrangement states of the TCP 22 and circuit board 23 as long as the gap between the ribs 32 can be filled up. Alternatively, the flexible seal member 41 may be provided selectively at the portion where the dust easily enters the inside of the device. For example, the flexible seal member 41 may be arranged in an L-character shape or frame-like shape. Further, although the flexible seal member 41 has a rectangular cross section in the above embodiment, the shape of the flexible seal member 41 may be changed depending upon the shape of other members near the mounting surface 36.

Figure 5A:
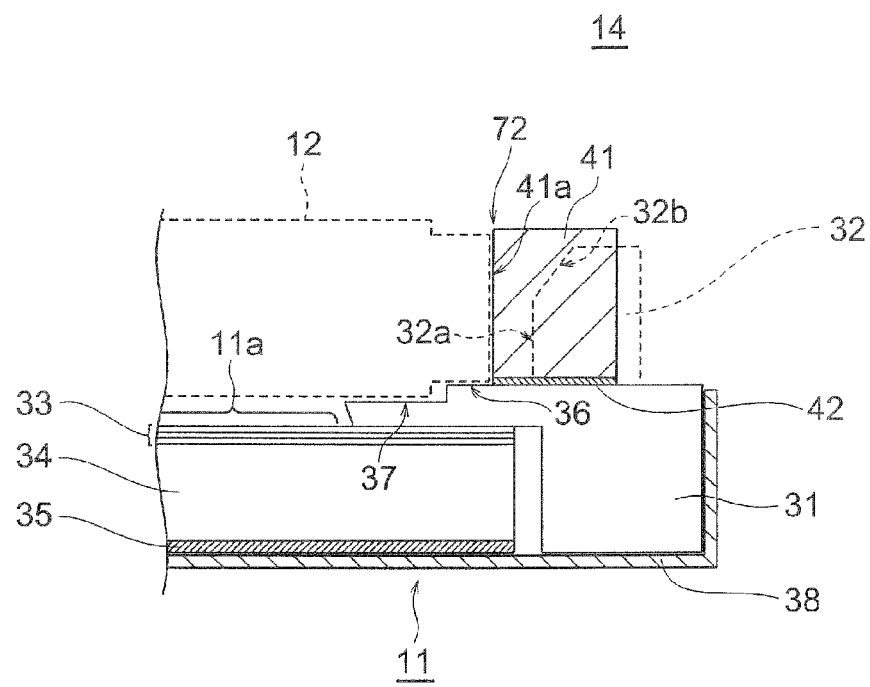
FIG. 5A is a sectional view showing a LCD device according to a comparative example of the first embodiment in the state where the panel assembly and the shield front are removed.
Figure 5B:
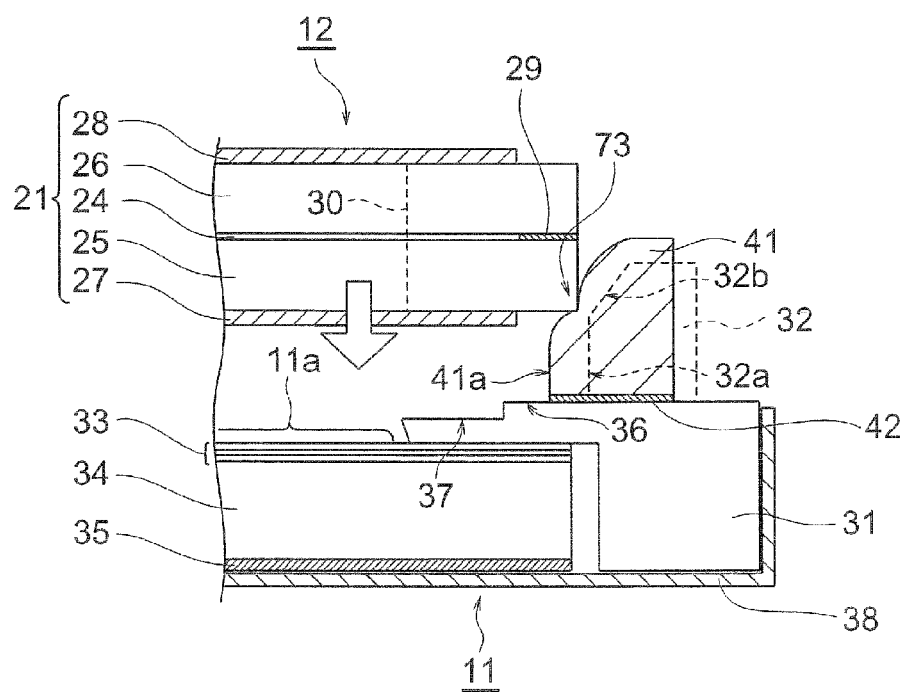
FIG. 5B is a sectional view showing the disadvantage of the LCD device of FIG. 5A.

FIG. 5A is a sectional view showing a LCD device according to a comparative example of the above embodiment in the state where the panel assembly 12 and shield front 13 are removed. As indicated by reference numeral 72, the flexible seal member 41 is provided on the mounting surface 36 at the position where the inner side surface 41a is brought into contact with the side edge of the display panel 21 in this LCD device 14. In this case, however, when the panel assembly 12 is mounted, the corner side of the display panel may be brought into contact with the flexible seal member 41 and run on the flexible seal member 41, as denoted by an arrow of reference numeral 73 in FIG. 5B.

Therefore, it is preferable for the flexible seal member 41 to be provided on the mounting surface 36 at the position away from the side edge of the display panel 21. Further, for the similar reason, it is preferable for the flexible seal member 41 to be provided on the mounting surface 36 at the position away from the side portion of the shield front 13.

Figure 6A:
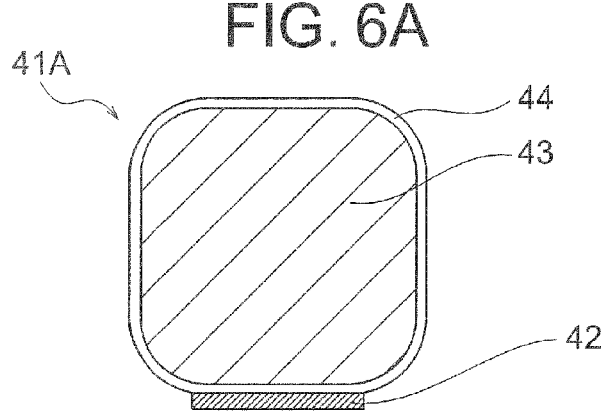
FIG. 6A is a sectional view showing the configuration of the flexible seal member used in a LCD device according to a first modification of the first embodiment.

FIG. 6A is a cross-sectional view of the flexible seal member used in a LCD device according to a first modification of the first embodiment. The flexible seal member 41A is configured by a flexible material 43 and a tubular member 44 encapsulating the flexible material 43, and is attached using a two-sided adhesive tape 42 onto the mounting surface. In the present modification, the flexible material 43 is made of foamed urethane, and the tubular member 44 is made of, e.g., a resin sheet. The flexible seal member 41A has substantially a quadrangle shaped cross-section in the state where the shield front 13 has not been attached.

Figure 6B:
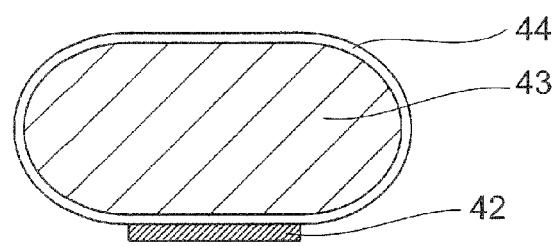
FIG. 6B is a sectional view showing the flexible seal member of FIG. 6A in the state where the shield front is attached.

As described above, the flexible seal member 41A has the tubular member 44 encapsulating the flexible material 43, whereby when a pressure is applied in the thickness direction, the volume of the flexible material 43 can effectively be moved in the in-plane direction of the display panel. In other word, as shown in FIG. 6B, when being pressed down in the thickness direction by the shield front, the flexible seal member 41A expands in the in-plane direction of the display panel more effectively. The flexible material 43 may be made of low-repulsion urethane, foamed silicone, foamed rubber, or gel; whereas the tubular member 44 may be made of cloth.

Figure 7:
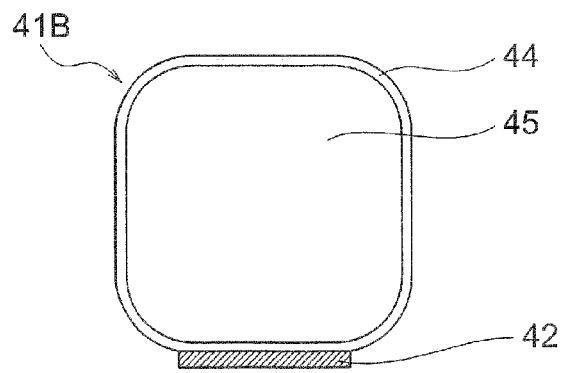
FIG. 7 is a sectional view showing the configuration of the flexible seal member used in a LCD device according to a second modification of the first embodiment.

FIG. 7 is a cross-sectional view of the flexible seal member used in a LCD device according to a second modification of the first embodiment. The flexible seal member 41B is configured by a tubular member 44 defining a hollow internal space 45. The tubular member 44 is made of, e.g., a resin sheet. The tubular member 44 has substantially a quadrangle shaped cross-section in the state where the shield front 13 has not been attached.

In the LCD device according to the present modification, it is possible to reduce the force required to deform the flexible seal member 41B in a flattened shape as compared to the case where the flexible seal member 41, 41A of the first embodiment or first modification is used. The tubular member 44 may be made of urethane, silicon, or rubber and may have a circular cross-section. The tubular member 44 need not perfectly seal the air within the space 45 and may have a structure in which an appropriate amount of air is discharged therefrom when a pressure is applied. The discharge of an appropriate amount of air at the time when the shield front 13 is attached prevents the repulsion force of the flexible seal member 41 from being excessively applied therefrom. Further, the tubular member 44 may have an appropriate elasticity. In this case, end portions of the tubular member 44 may have an opening as a straw.

In a LCD device according to a third modification of the first embodiment, an adhesive material such as silicone is used as an overcoat on the surface of the flexible seal member 41. The use of this adhesive material used as the overcoat on the surface of the flexible seal member 41 will further increase the adhesiveness between the flexible seal member 41 and side edge of the display panel 21. Further, this configuration allows the dust that has entered the inside of the shield front 13 to be adhered onto the adhesive material, thereby further preventing the dust from entering the rear side of the display panel 21. A similar advantage may be obtained by providing the surface of the flexible seal member 41 with an adhesion property.

Figure 8A:
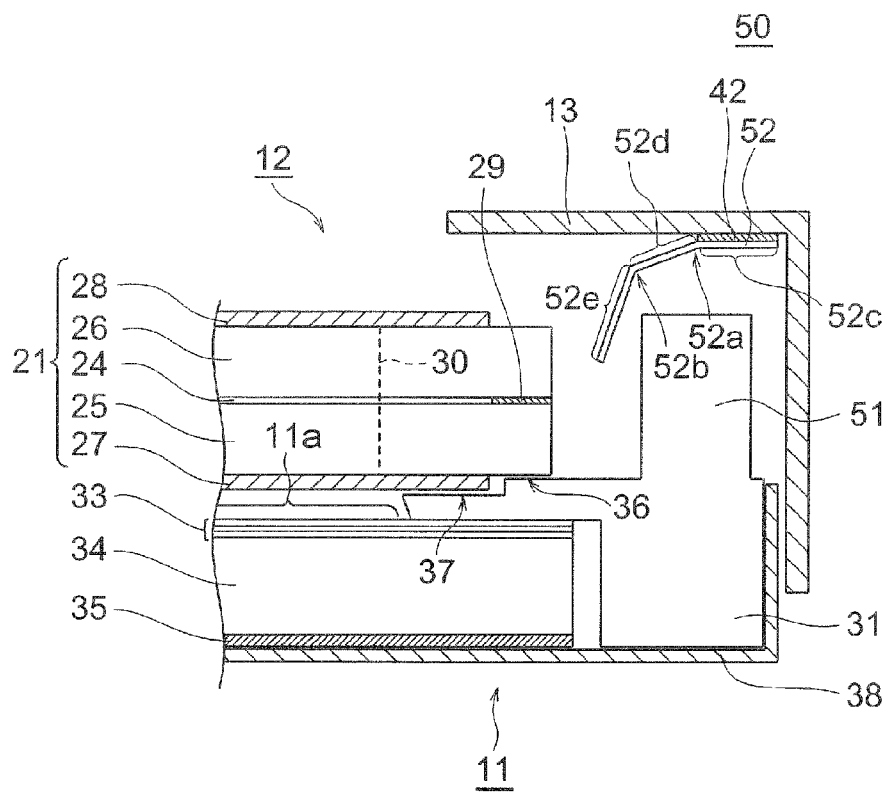
FIG. 8A is a sectional view showing a LCD device according to a second embodiment of the present invention in the state where the shield front is removed from the light source unit.
Figure 8B:
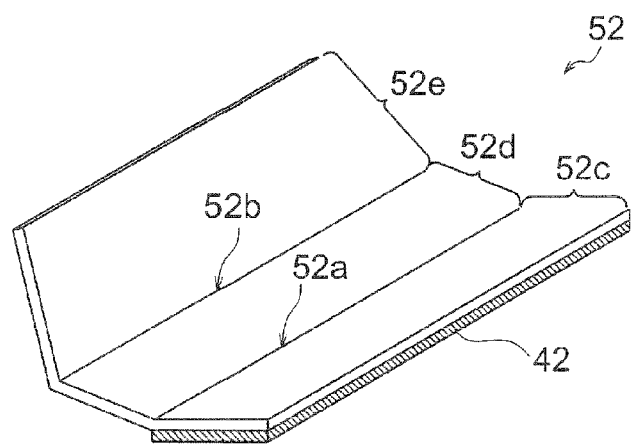
FIG. 8B is a perspective view showing the configuration of the stripe member shown in FIG. 8A.

FIG. 8A is a sectional view showing a LCD device according to a second embodiment of the present invention in the state where the shield front 13 is to be attached onto the light source unit 11. In the LCD device 50 according to the second embodiment, a projection member 51 is provided which projects from the mounting surface 36 in the vertical direction. The projection member 51, which is of an elongate shape and has a rectangular cross section, is provided on the line extending from the linear piece of the ribs 32 to fill the gap between adjacent ribs 32. The projection member 51 is provided near the edges of the display panel 21 on which the TCP 22 and circuit board 23 are not provided, Further, in the LCD device 50, a stripe flexible seal member 52 is so provided on the inner rear surface of the shield front 13 opposing the mounting surface 36 to face the projection member 51. FIG. 8B is a perspective view showing the configuration of the stripe member 52 shown in FIG. 8A. The stripe flexible seal member 52, which is of an elongate sheet material, has two fold lines 52*a* and 52*b* extending in the extending direction of the stripe flexible seal member 52. Three planar sections 52*c* to 52*e* are formed across the two fold lines 52*a* and 52*b*. As shown in FIG. 8A, the outer surface of the planar section 52*c* is fixed onto the rear surface of the shield front 13 by way of a two-sided adhesion tape 42.

As viewed from the mounting surface 36, the vertical dimension of the projection member 51 is set to a value obtained by subtracting the thickness of the stripe flexible seal member 52 and two-sided adhesion tape 42 from the height of the rear surface of the shield front 13 in the state where the shield front 13 has been attached onto the mounting surface 36. Although the projection member 51 is integrally formed with the chassis 31 by molding, it may be formed separately from the chassis 31 and then fitted thereto. Further, although the stripe flexible seal member 52 is made of a resin sheet, it may be made of a metallic material.

Figure 9:
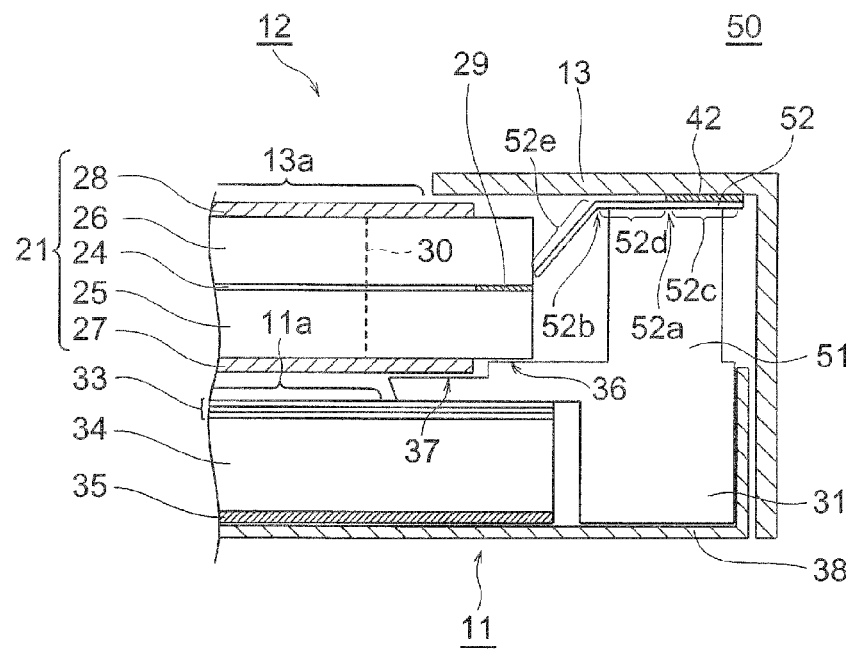
FIG. 9 is a sectional view showing the LCD device of FIG. 8A in the state where the shield front is attached onto the light source unit.

FIG. 9 is a sectional view showing the LCD device of FIG. 8A in the state where the shield front 13 has been attached onto the light source unit 11. After the shield front 13 is attached, the top surface of the projection member 51 is brought into contact with the planar section 52*d* to lift up the planar sections 52*d* and 52*e*. The edge of the lifted-up planar section 52*e* is pressed toward the side edge of the display panel 21 with an appropriate force. As a result, the entrance path of the dust can be blocked off. Further, in this state, the flexible seal member 52 does not press the display panel 21 in the thickness direction, whereby occurrence of a change in the thickness of the LC layer 24 can be avoided to prevent the uneven image.

When the panel assembly 12 is mounted onto the light source unit 11, or when the shield front 13 is attached onto the light source unit 11, the flexible seal member 52 is not brought into contact with the side edge of the display panel 21 or side portion of the shield front 13. Therefore, the LCD device 50 can be assembled with ease. Further, since the flexible seal member 52 is made of a comparatively soft resin sheet, the force required to deform the flexible seal member 52 can be reduced.

Contrary to the case of the above embodiment, the projection member 51 may be formed on the inner rear surface of the shield front 13, and the stripe flexible seal member 52 may be provided on the mounting surface 36. The shape of the projection member 51 is not limited to the rectangular cross section so long as at least a part that is brought into contact with the plane 52*d* of the stripe member 52 at the time of attachment of the shield front 13. Further, the projection member 51 need not be provided in the entire part of the gap between the ribs 32, and it may partly be formed so long as it can press the stripe flexible seal member 52 at the time of attachment of the shield front 13. The stripe member 52 may arbitrarily be provided in correspondence with various arrangement states of the TCP 22 and circuit board 23 so long as the gap between the ribs 32 is filled up. Alternatively, the projection member 51 may be provided selectively at the portion where the dust is likely to enter the inside of the device.

Figure 10:
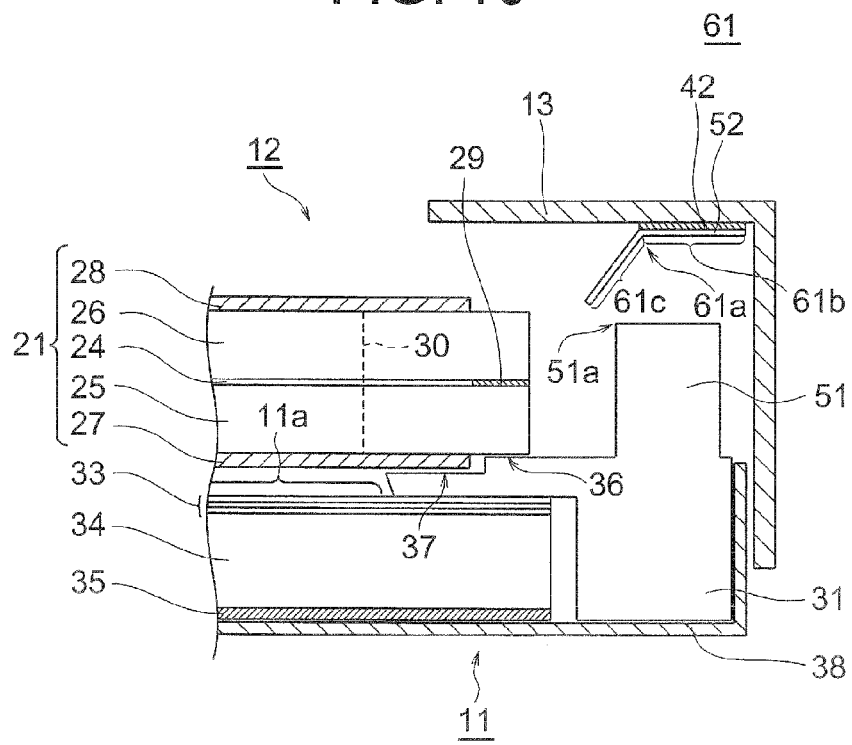
FIG. 10 is a sectional view showing the configuration of a LCD device according to a first modification of the second embodiment.

The stripe member 52 need not have two fold lines and may have only one fold line. FIG. 10 is a sectional view showing the configuration of a LCD device according to a first modification of the second embodiment. In the LCD device 61, the stripe flexible seal member 52 has one fold line 61*a* extending along the extending direction of the stripe member 52, and two planar sections 61*b* and 61*c* are formed across the fold line 61*a*. After the shield front 13 is attached, a corner side 51*a* of the projection member 51 is brought into contact with the planar section 61*c* to lift up the planar section 61*c*. The edge portion of the lifted up planar section 61*c* presses the side edge of the display panel 21 with an appropriate force to thereby block off the entry route of the dust. In the present modification, the vertical dimension of the projection member 51 may be set slightly smaller than the value set in the second embodiment so as to suppress the degree of deformation of the stripe flexible seal member 52 at the time of attachment of the shield front 13.

Figure 11:
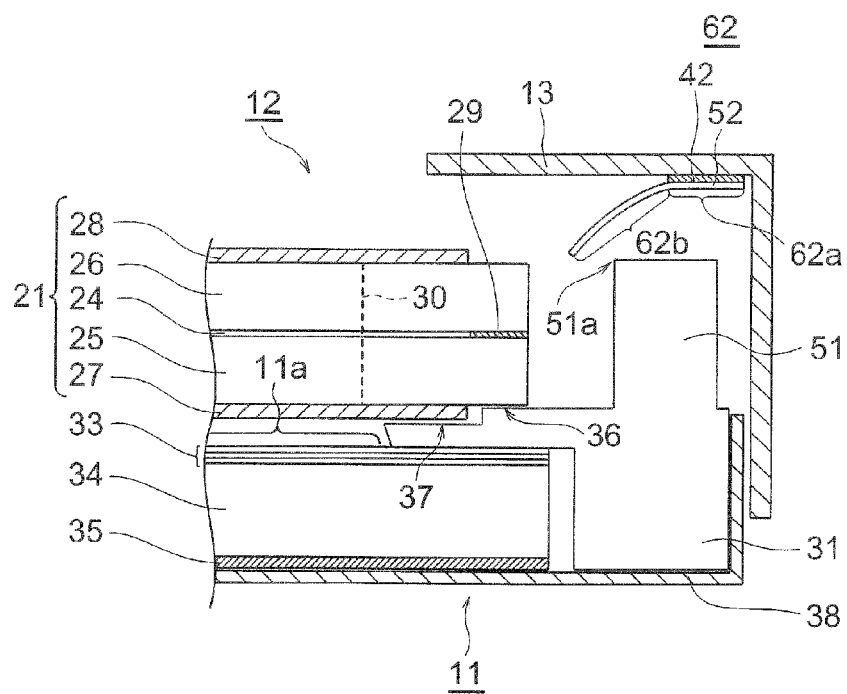
FIG. 11 is a sectional view showing the configuration of a LCD device according to a second modification of the second embodiment.

The stripe member 52 need not have the fold line and may have a shape curved in the vertical direction of the edge surface of the display panel 21. FIG. 11 is a sectional view showing the configuration of a LCD device according to a second modification of the second embodiment. In the LCD device 62, a first planar section 62*a* of the stripe member 52 near the outer edge of the shield front 13 is fixed onto the inner rear surface of the shield front 13 by way of a two-sided adhesion tape 42, and a second curved section 62*b* of the stripe member 52 near the display panel 21 has a shape curved toward the mounting surface 36. After the shield front 13 is attached, the top surface of the projection member 51 is brought into contact with the second curved section 62*b* to lift it up. The edge of the lifted up second curved section 62*b* presses the side edge of the display panel 21 with an appropriate force to thereby block off the entry route of the dust.

Figure 12:
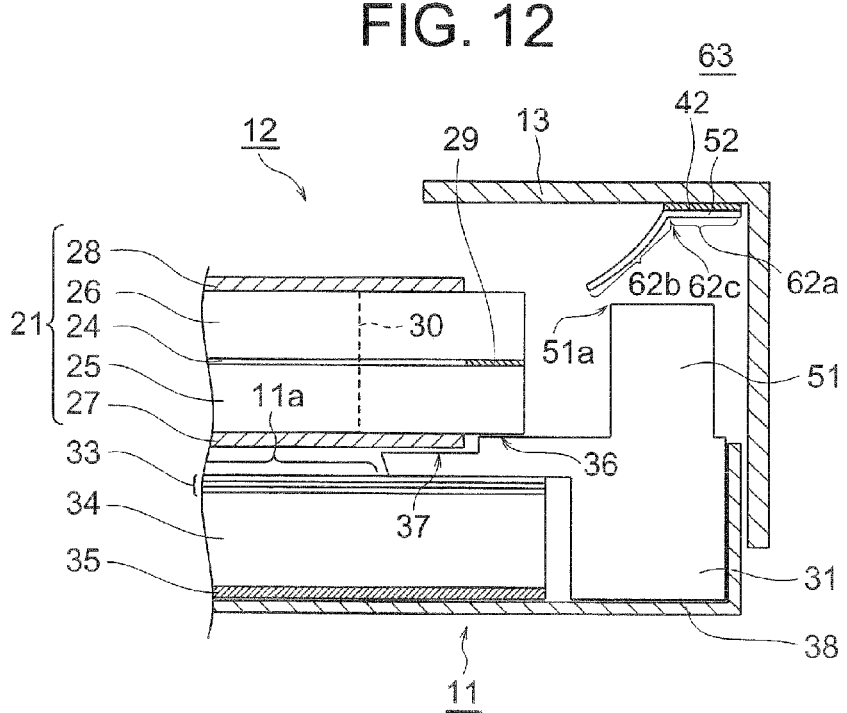
FIG. 12 is a sectional view showing the configuration of a LCD device according to a third modification of the second embodiment.

FIG. 12 is a sectional view showing the configuration of a LCD device according to a third modification of the second embodiment. In the LCD device 63, the second curved section has a shape curved toward the rear surface of the shield front 13. A fold line 62*c* is formed on the border between the first planar section 62*a* and the second curved section 62*b*. After the shield front 13 is attached, the corner edge of the projection member 51 is brought into contact with the second curved section 62*b* to lift it up. The edge of the lifted up second curved section 62*b* presses the side edge of the display panel 21 with an appropriate force to thereby block off the entry route of the dust. Also in the present modification, the vertical dimension of the projection member 51 may be set slightly smaller than the value set in the second embodiment, as in the case of the first modification of the second embodiment.

In accordance with the LCD device of the above embodiments, the flexible seal member presses the display panel in the in-plane direction of the display panel to prevent the dust entering toward the rear side of the display panel, thereby achieving an excellent image quality.

In the LCD device of the present invention, the flexible seal member may be pressed by at least one of the backlight unit and the shield front to expand in the in-plane direction of the display panel and press the edge surface.

In addition, one of the backlight unit and the shield front may include a press member for pressing the flexible seal member toward the edge surface.

Further, the flexible seal member may be fixed by adhesion.

Further, the flexible seal member may include urethane, silicone, and/or rubber.

Further, the flexible seal member may have therein a hollow space.

In an alternative, the flexible seal member may include a flexible material member and a tubular member encapsulating therein the flexible material member.

Further, the flexible seal member may be configured by a stripe member having a first edge portion fixed onto the one of the backlight unit and the shield front, and a second edge portion pressed toward the edge surface of the display panel due to a force applied at a central portion of the flexible seal member between the first edge portion and the second edge portion by a press member formed on the other of the backlight unit and the shield front.

Further, the stripe member has a fold line extending along an extending direction of the stripe member.

Further, the stripe member may have a curved portion between the first edge portion and the second edge.

Further, the stripe member may have a planar portion between the first edge portion and the second edge portion.

Although the present invention has been described with reference to the preferred embodiments, the LCD device according to the present invention is not limited to the configurations described in the above embodiments, and a LCD device obtained by making various modifications and changes in the configurations of the above-described embodiments will fall within the scope of the present invention.

What is claimed is:

1. A liquid crystal display (LCD) device comprising:
 a display panel including a liquid crystal (LC) layer sandwiched between a pair of substrates;
 a backlight unit for supplying light to said LC layer through a rear surface of the opposing side of a display surface of said display panel;
 a shield front attachable onto said backlight unit for partially disposing said display panel between said shield front and said backlight unit;
 a plurality of ribs being disposed on said backlight unit, arranged along the four edges of said display panel and restricting a position in an in-plane direction of said display panel, wherein each of said ribs has a position-restricting wall opposing a side edge of said display panel; and
 a flexible seal member being fixed onto one of said backlight unit and said shield front, said flexible seal member being arranged along said side edge of said display panel, and configured to press a side edge of said display panel only in an in-plane direction of said display panel, wherein said flexible seal member has a side surface for pressing said side edge of said display panel, wherein
 before said shield front is attached onto said backlight unit, said side surface of said flexible seal member is spaced apart from said side edge of said display panel in said in-plane direction of said display panel at a distance the same or greater than the distance from said side edge of said display panel to one of said position-restricting walls adjacent to said flexible seal member, and
 when said shield front is being attached onto said backlight unit said flexible seal member is pressed in a vertical direction of said display surface of said display panel by said backlight unit and said shield front to expand in said in-plane direction of said display panel, and thereby bring said side surface of said flexible seal member into contact with said side edge of said display panel.

2. The LCD device according to claim 1, wherein said flexible seal member is pressed in said vertical direction of said display surface of said display panel using a pressing member provided in at least one of said backlight unit and said shield front.

3. The LCD device according to claim 1, wherein said flexible seal member is fixed by adhesion.

4. The LCD device according to claim 1, wherein said flexible seal member includes urethane, silicone, and/or rubber.

5. The LCD device according to claim 1, wherein said flexible seal member has therein a hollow space.

6. The LCD device according to claim 1, wherein said flexible seal member includes a flexible material member and a tubular member encapsulating therein said flexible material member.

7. A liquid crystal display (LCD) device comprising:
- a display panel including a liquid crystal (LC) layer sandwiched between a pair of substrates;
- a backlight unit for supplying light to said LC layer through a rear surface of the opposing side of a display surface of said display panel;
- a shield front attachable onto said backlight unit for partially disposing said display panel between said shield front and said backlight unit;
- a plurality of ribs being disposed on said backlight unit, arranged along the four edges of said display panel and restricting a position in an in-plane direction of said display panel, wherein each of said ribs has a position-restricting wall opposing a side edge of said display panel; and
- a flexible seal member being fixed onto one of said backlight unit and said shield front, said flexible seal being arranged along said displayed panel, and configured to press a side edge of said display panel only in an in-plane direction of said display panel, wherein said flexible seal member is configured by a stripe member having a first edge portion fixed onto one of said backlight unit and said shield front, and a second edge portion for pressing said side edge of said display panel, wherein before said shield front is attached onto said backlight unit, said second edge portion of said flexible seal member is spaced apart from said side edge of said display panel in the in-plane direction of said display panel at a distance the same or greater than the distance from said side edge of said display panel to one of said position-restricting walls adjacent to said flexible seal member, and when said shield front is being attached onto said backlight unit, said second edge portion of said flexible seal member is brought into contact with said edge surface of said display panel due to a force applied in a vertical direction of said display surface of said display panel at a portion of said flexible seal member between said first edge portion and said second edge portion by a pressing member provided on the other of said backlight unit and said shield front.

8. The LCD device according to claim 7, wherein said stripe member has a fold line extending along an extending direction of said stripe member.

9. The LCD device according to claim 8, wherein said stripe member has a curved portion between said first edge portion and said second edge.

10. The LCD device according to claim 8, wherein said stripe member has a planar portion between said first edge portion and said second edge portion.

* * * * *